United States Patent
Zeng et al.

(10) Patent No.: US 9,300,942 B2
(45) Date of Patent: Mar. 29, 2016

(54) METHOD AND CONTROL SYSTEM FOR THREE-DIMENSIONAL VIDEO PLAYBACK USING VISUAL FATIGUE ESTIMATION

(71) Applicant: Industrial Technology Research Institute, Hsinchu (TW)

(72) Inventors: Wen-Jun Zeng, Hsinchu County (TW); Ming-Hui Lin, Hsinchu County (TW); Yu-Ting Lin, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 377 days.

(21) Appl. No.: 13/939,188

(22) Filed: Jul. 11, 2013

(65) Prior Publication Data

US 2014/0111626 A1  Apr. 24, 2014

Related U.S. Application Data

(60) Provisional application No. 61/715,792, filed on Oct. 18, 2012.

(30) Foreign Application Priority Data

Mar. 7, 2013  (CN) .......................... 2013 1 0073099

(51) Int. Cl.
*H04N 13/00* (2006.01)

(52) U.S. Cl.
CPC ....... *H04N 13/0033* (2013.01); *H04N 13/0022* (2013.01)

(58) Field of Classification Search
CPC .................. H04N 13/0033; H04N 13/0022
See application file for complete search history.

(56) References Cited

U.S. PATENT DOCUMENTS

| | | | |
|---|---|---|---|
| 4,647,965 A | 3/1987 | Imsand | |
| 5,726,704 A | 3/1998 | Uomori | |
| 6,677,939 B2 | 1/2004 | Uchiyama | |
| 6,798,406 B1 | 9/2004 | Jones et al. | |
| 6,996,267 B2 | 2/2006 | Tabata | |
| 7,417,664 B2 | 8/2008 | Tomita | |
| 7,557,824 B2 | 7/2009 | Holliman | |
| 7,623,089 B2 | 11/2009 | Sato | |

(Continued)

FOREIGN PATENT DOCUMENTS

| | | |
|---|---|---|
| CN | 1643939 | 7/2005 |
| EP | 2357839 | 8/2011 |
| JP | 4149037 | 9/2008 |

OTHER PUBLICATIONS

Hyung-Chul O. Li et al., "Measurement of 3D Visual Fatigue Using Event-Related Potential (ERP): 3D Oddball Paradigm," 3DTV Conference: The True Vision—Capture, Transmission and Display of 3D Video, May 28-30, 2008, pp. 213-216.

(Continued)

*Primary Examiner* — Thai Tran
*Assistant Examiner* — Christopher T Braniff
(74) *Attorney, Agent, or Firm* — Jianq Chyun IP Office (57) ABSTRACT

A method for playing a three-dimensional video is provided, which includes the following steps. A disparity velocity or a disparity acceleration for at least one continuous video in the three-dimensional video is calculated. A visual fatigue estimating value of a viewer is calculated according to the disparity velocity or the disparity acceleration. A subsequent playback of the three-dimensional video is controlled according to the visual fatigue estimating value.

16 Claims, 6 Drawing Sheets

(56) References Cited

U.S. PATENT DOCUMENTS

| | | | |
|---|---|---|---|
| 7,720,308 B2 | 5/2010 | Kitaura et al. | |
| 7,944,444 B2 | 5/2011 | Ha et al. | |
| 8,045,792 B2 | 10/2011 | Koo et al. | |
| 2004/0057612 A1 | 3/2004 | Tabata | |
| 2009/0096863 A1 | 4/2009 | Kim et al. | |
| 2010/0275238 A1* | 10/2010 | Nagasawa | H04N 13/0033 725/116 |
| 2011/0063421 A1 | 3/2011 | Kubota | |
| 2011/0142309 A1* | 6/2011 | Zhang | H04N 13/0022 382/128 |
| 2011/0267338 A1 | 11/2011 | Nam et al. | |
| 2012/0148147 A1 | 6/2012 | Ogata et al. | |

OTHER PUBLICATIONS

Kazuhiko Ukai et al., "Visual fatigue caused by viewing stereoscopic motion images: Background, theories, and obsertvations," Health and Safety Aspects of Visual Displays, vol. 29, Issue 2, Mar. 2008, pp. 106-116.

Manuel Lang et al., "Nonlinear Disparity Mapping for Stereoscopic 3D," ACM Transactions on Graphics (TOG)—Proceedings of ACM SIGGRAPH, vol. 29, Issue 4, Jul. 2010, pp. 1-10.

Yu-Ting Lin et al., "Evaluation of Image Quality and Subjective Visual Fatigue in Autostereoscopic Displays for 3D Dynamic Image Design," International Meeting on Information Display DIGEST, Aug. 28-31, 2012, pp. 1-2.

Geng Sun et al., "Evaluating Method for Controlling Depth Perception in Stereoscopic Cinematography," SPIE Proceedings vol. 7237, Feb. 12, 2009, pp. 1-12.

Marc Lambooij et al., "Visual Discomfort and Visual Fatigue of Stereoscopic Displays: A Review," Journal of Imaging Science and Technology, vol. 53, No. 3, May 2009, pp. 30201-1-30201-14.

"Office Action of Chinese Counterpart Application", issued on May 14, 2015, p. 1-p. 5.

* cited by examiner

METHOD AND CONTROL SYSTEM FOR THREE-DIMENSIONAL VIDEO PLAYBACK USING VISUAL FATIGUE ESTIMATION

CROSS-REFERENCE TO RELATED APPLICATION

This application claims the priority benefits of U.S. provisional application Ser. No. 61/715,792, filed on Oct. 18, 2012 and China application serial no. 201310073099.3, filed on Mar. 7, 2013. The entirety of each of the above-mentioned patent applications is hereby incorporated by reference herein and made a part of this specification.

TECHNICAL FIELD

The disclosure relates to a method and a control system for playing a three-dimensional video, and more particularly, to a method and a control system for playing a three-dimensional video using visual fatigue estimation.

BACKGROUND

The ergonomic issue of three-dimensional displaying has always been existed. For instance, the three-dimensional videos may easily cause visual fatigue for viewers. In recent years, many research institutions have carried out various research investigations on the effect of the content of the three-dimensional video to humans, and the industry currently attempts to set a standard for three-dimensional display according to the results from the research investigations.

Among the current technologies, using disparity adjustment to reduce the viewer's visual fatigue while watching a three-dimensional video has been employed by majority in the related industries. Disparity adjustment is performed, mainly, according to a disparity range in the recent technologies. However, if only the disparity range of the three-dimensional video is considered, it is not enough for viewers to prevent from visual fatigue.

SUMMARY

Accordingly, the disclosure is a method and a control system for playing a three-dimensional video using visual fatigue estimation.

The disclosure provides a method for playing a three-dimensional video, which includes the following steps. A disparity velocity or a disparity acceleration for at least one continuous video in the three-dimensional video is calculated. A visual fatigue estimating value of a viewer is calculated according to the disparity velocity or the disparity acceleration. A subsequent playback of the three-dimensional video is controlled according to the visual fatigue estimating value.

The disclosure provides a control system adapted to control a playback of a three-dimensional video. The control system includes a three-dimensional video stream input unit, a disparity estimation unit, a visual fatigue estimation unit, a fatigue recovery control unit and a three-dimensional video stream display unit. The disparity estimation unit is coupled to the three-dimensional video stream input unit, and the disparity estimation unit calculates a disparity velocity or a disparity acceleration for at least one continuous video in the three-dimensional video. The visual fatigue estimation unit is coupled to the disparity estimation unit, and the visual fatigue estimation unit calculates a visual fatigue estimating value of a viewer according to the disparity velocity or the disparity acceleration. The fatigue recovery control unit is coupled to the three-dimensional video stream input unit and the visual fatigue estimation unit, and the fatigue recovery control unit controls a subsequent playback of the three-dimensional video according to the visual fatigue estimating value. The three-dimensional video stream display unit is coupled to the fatigue recovery control unit.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Figure 1:
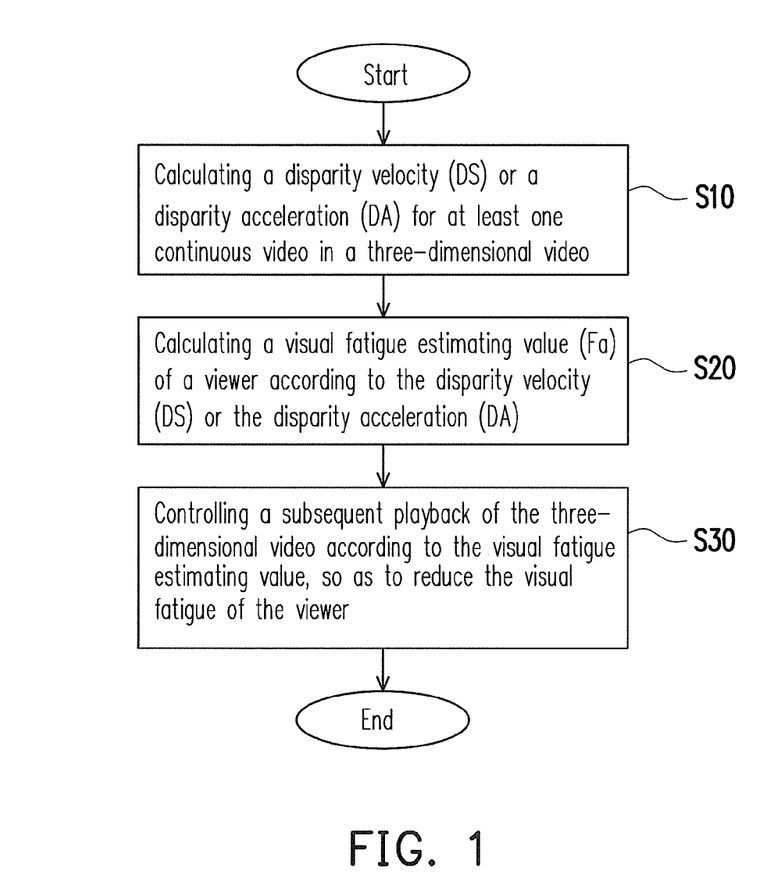
FIG. 1 is a flowchart diagram illustrating a method for playing a three-dimensional video according to an embodiment of the disclosure.

FIG. 1 is a flowchart diagram illustrating a method for playing a three-dimensional video according to an embodiment of the disclosure. Referring to FIG. 1, the method for playing a three-dimensional video in the disclosure includes the following steps. Firstly, a disparity velocity (DS) or a disparity acceleration (DA) for at least one continuous video in the three-dimensional video is calculated (step S10). Then, a visual fatigue estimating value (Fa) of a viewer is calculated according to the disparity velocity (DS) or the disparity acceleration (DA) (step S20). Afterwards, a subsequent playback of the three-dimensional video is controlled according to the visual fatigue estimating value, so as to reduce the visual fatigue of the viewer (step S30).

In an embodiment of the disclosure, the visual fatigue estimating value (Fa) may be calculated and obtained according to the disparity velocity (DS) for the at least one continuous video in the three-dimensional video. Here, the disparity velocity (DS) can be defined as a change of a disparity range within a time unit. For example, the visual fatigue estimating value (Fa) may be calculated through Formula (1) and Formula (2) as follow, in which fa is a visual fatigue estimating value of the viewer after watching at each of time units in the continuous video, Fa is an overall visual fatigue estimating value of the viewer after watching the continuous video, and T is a time.

$$fa = f(DS) \quad (1)$$

$$Fa = f(fa, T) \quad (2)$$

It can be known from the above Formulas (1) and (2) that, the visual fatigue estimating value (fa) is related to the disparity velocity (DS), whereas the overall visual fatigue estimating value (Fa) is related to the visual fatigue estimating value (fa) and the time (T). When the absolute value of the disparity velocity (DS) becomes greater, the visual fatigue estimating value (fa) becomes higher. Contrarily, when the absolute value of the disparity velocity (DS) becomes smaller (that is, when the disparity velocity (DS) is closer to zero), the visual fatigue estimating value (fa) becomes lower.

Figure 2:
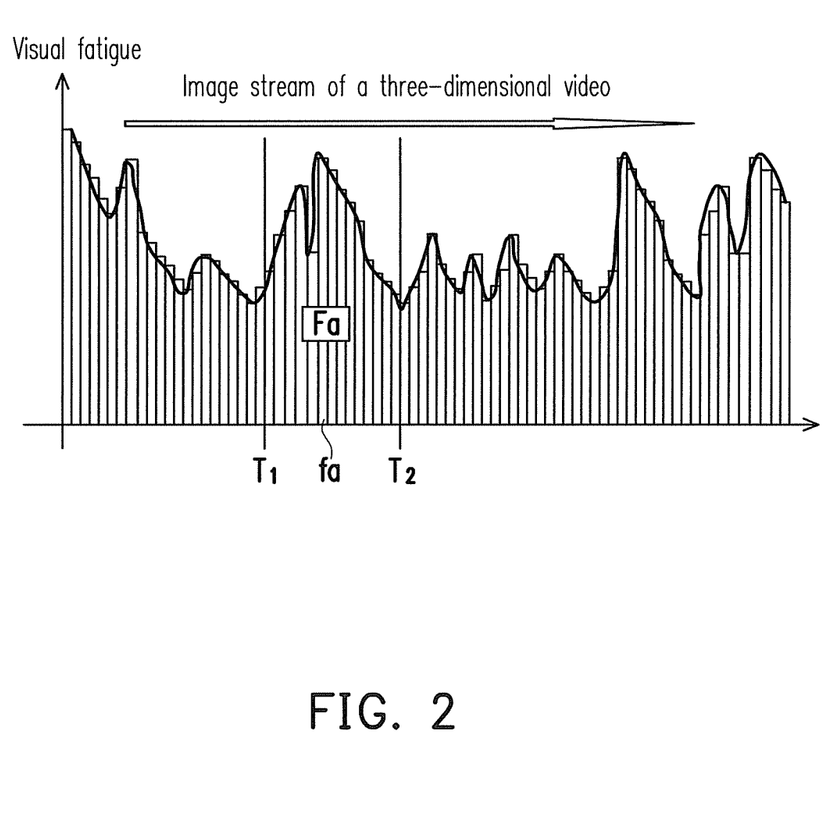
FIG. 2 is a diagram illustrating the relationship between a time and a visual fatigue.

FIG. 2 is a diagram illustrating the relationship between a time and a visual fatigue. Referring to FIG. 2, during the calculation of the overall visual fatigue estimating value (Fa), for instance, a specific continuous video in the three-dimensional video may be firstly selected (that is, from time T1 to time T2), and the visual fatigue estimating value (fa) at each of the time units is cumulated from time T1 to time T2, so as to obtain the overall visual fatigue estimating value (Fa) related to the disparity velocity (DS). It should be noted that the method for calculating the visual fatigue estimating value (Fa) in the disclosure is not limited to Formula (1) and Formula (2) described above.

In another embodiment of the disclosure, the visual fatigue estimating value (Fa) may be calculated and obtained according to the disparity acceleration (DA) for the at least one continuous video in the three-dimensional video. Here, the disparity acceleration (DA) can be defined as a change of the disparity velocity (DS) within a time unit. For example, the visual fatigue estimating value (Fa) may be calculated through Formula (3) and Formula (4) as follow, in which fa is a visual fatigue estimating value of the viewer after watching at each of the time units in the continuous video, Fa is an overall visual fatigue estimating value of the viewer after watching the continuous video, and T is a time.

$$fa=f(DA) \quad (3)$$

$$Fa=f(fa,T) \quad (4)$$

Similarly, as shown in FIG. 2, during the calculation of the overall visual fatigue estimating value (Fa), for instance, a specific continuous video in the three-dimensional video may be firstly selected (that is, from time T1 to time T2), and the visual fatigue estimating value (fa) at each of the time units is cumulated from time T1 to time T2, so as to obtain the overall visual fatigue estimating value (Fa) related to the disparity acceleration (DA).

In other embodiments of the disclosure, other than the disparity velocity (DS) and/or the disparity acceleration (DA) described above, parameters such as time (T), temporal weight ($R_T$), disparity velocity weight ($V_i$), disparity range weight ($W_d$), disparity mean position (P) and disparity direction (DD), may also served as the parameters for calculating the overall visual fatigue estimating value (Fa).

For example, the visual fatigue estimating value (Fa) may be calculated through Formula (5) and Formula (6) as follow, in which X in Formula (5) can be at least one of the afore-described disparity acceleration (DA), time (T), temporal weight ($R_T$), disparity velocity weight ($V_i$), disparity range weight ($W_d$), disparity mean position (P), disparity direction (DD), lateral velocity, brightness and contrast, while fa is the visual fatigue estimating value of the viewer after watching at each of the time units in the continuous video, and Fa is the overall visual fatigue estimating value of the viewer after watching the continuous video.

$$fa=f(DS,X) \quad (5)$$

$$Fa=f(fa,T) \quad (6)$$

As shown in FIG. 2, during the calculation of the overall visual fatigue estimating value (Fa), for instance, a specific continuous video in the three-dimensional video may be firstly selected (that is, from time T1 to time T2), and the visual fatigue estimating value (fa) at each of the time units is cumulated from time T1 to time T2, so as to obtain the overall visual fatigue estimating value (Fa) related to the disparity velocity (DS) and the parameter (X).

In another embodiment, the visual fatigue estimating value (Fa) may also be calculated through Formula (7) and Formula (8) as follow, in which X in Formula (7) can be at least one of the afore-described disparity velocity (DS), time (T), temporal weight ($R_T$), disparity velocity weight (V), disparity range weight ($W_d$), disparity mean position (P), disparity direction (DD), lateral velocity, brightness and contrast, while fa is the visual fatigue estimating value of the viewer after watching at each of the time units in the continuous video, and Fa is the overall visual fatigue estimating value of the viewer after watching the continuous video.

$$fa=f(DA,X) \quad (7)$$

$$Fa=f(fa,T) \quad (8)$$

As shown in FIG. 2, during the calculation of the overall visual fatigue estimating value (Fa), for instance, a specific continuous video in the three-dimensional video may be firstly selected (that is, from time T1 to time T2), and the visual fatigue estimating value (fa) at each of the time units is cumulated from time T1 to time T2, so as to obtain the overall visual fatigue estimating value (Fa) related to the disparity acceleration (DA) and the parameter (X).

The disclosure provides a control system 100 to implement the afore-described method for playing the three-dimensional video, in order to control the playback of the three-dimensional video and effectively control the visual fatigue of the viewer.

Figure 3:
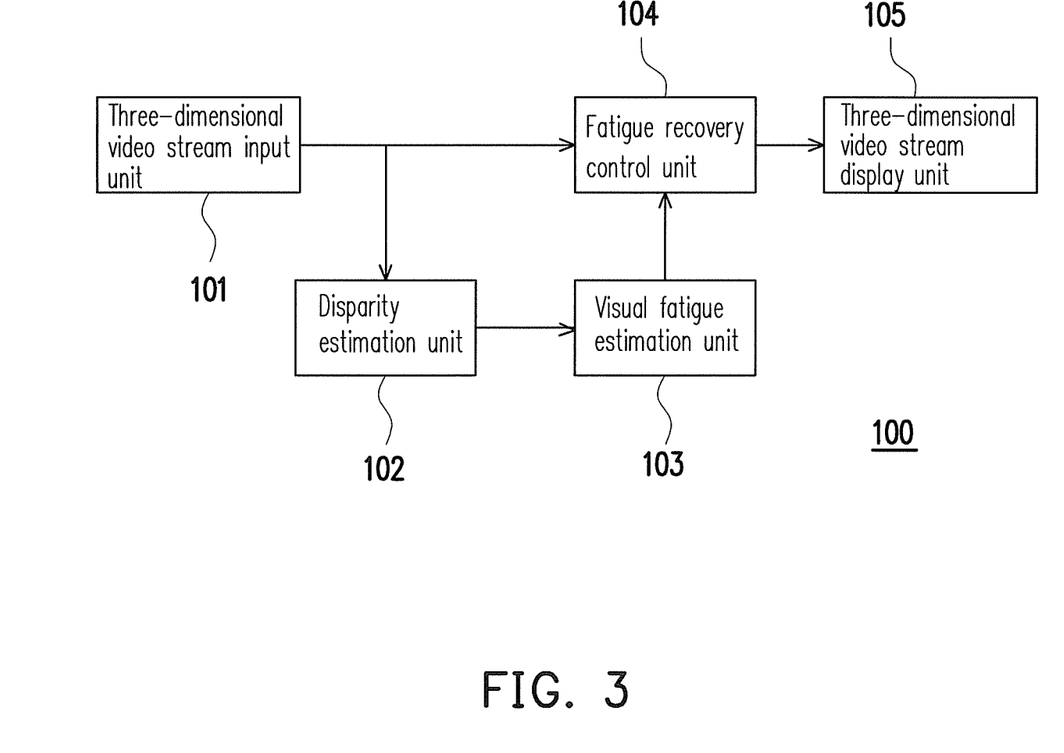
FIG. 3 is a schematic block diagram illustrating a control system according to an embodiment of the disclosure.

FIG. 3 is a schematic block diagram illustrating a control system according to an embodiment of the disclosure. Referring to FIG. 3, the control system 100 includes a three-dimensional video stream input unit 101, a disparity estimation unit 102, a visual fatigue estimation unit 103, a fatigue recovery control unit 104 and a three-dimensional video stream display unit 105. The disparity estimation unit 102 is coupled to the three-dimensional video stream input unit 101, and the disparity estimation unit 102 calculates the disparity velocity (DS) or the disparity acceleration (DA) for the at least one continuous video in the three-dimensional video. The visual fatigue estimation unit 103 is coupled to the disparity estimation unit 102, and the visual fatigue estimation unit 103 calculates the visual fatigue estimating value of the viewer according to the disparity velocity (DS) or the disparity acceleration (DA). The fatigue recovery control unit 104 is coupled to the three-dimensional video stream input unit 101 and the visual fatigue estimation unit 103. The fatigue recovery control unit 104 controls the subsequent playback of the three-dimensional video according to the visual fatigue estimating value. The three-dimensional video stream display unit 105 is coupled to the fatigue recovery control unit 104.

In the embodiment, the three-dimensional video stream input unit 101 reads a three-dimensional video stream from a video storage medium or an internet video stream into the control system 100. For example, the three-dimensional video stream read by the three-dimensional video stream input unit 101 can be a three-dimensional video stream with single view or a three-dimensional video stream with multi view.

After the three-dimensional video stream is outputted from the three-dimensional video stream input unit 101, the disparity estimation unit 102 divides the three-dimensional video stream into a plurality of video streams, and calculates the disparity velocity (DS) and/or the disparity acceleration (DA) for the video stream at each of the time units. In the embodiment, each of the time units is two seconds, for instance. In other embodiments, each of the time units is corresponded to one or more group of pictures (GOP) in the three-dimensional video, for instance. However, the method for the disparity estimation unit 102 to divide the three-dimensional video stream is not limited in the disclosure.

In the embodiment, the disparity estimation unit 102 calculates one or several disparity velocities (DS) and/or the disparity accelerations (DA) for the video stream after being divided by each of the time units. For example, the disparity estimation unit 102 may calculate one disparity velocity (DS) for the video stream at each of the time units. Alternatively, the disparity estimation unit 102 may calculate the disparity velocity (DS), a maximum disparity velocity ($DS_{max}$) and/or a minimum disparity velocity ($DS_{min}$) for the video stream at each of the time units, or else, the disparity estimation unit 102 may calculate the disparity acceleration (DA) for the video stream at each of the time units. In other embodiments, the disparity estimation unit 102 may further calculate other different parameters such as the disparity range (D), the lateral velocity, the content brightness or the contrast, for the video stream at each of the time units.

Additionally, the calculation of the disparity velocity (DS) and/or the disparity acceleration (DA) through the disparity estimation unit 102 is to perform on all or a part of regions in the continuous video. For example, the disparity estimation unit 102 can only calculate the disparity velocity (DS) and/or the disparity acceleration (DA) of the central region in the continuous video, or can only calculate the disparity velocity (DS) and/or the disparity acceleration (DA) of a dynamic body object in the continuous video.

The disparity velocity (DS) and/or the disparity acceleration (DA) calculated by the disparity estimation unit 102 may be transferred to the visual fatigue estimation unit 103. The visual fatigue estimation unit 103 calculates the overall visual fatigue estimating value (Fa) according to the disparity velocity (DS) and/or the disparity acceleration (DA).

Subsequently, the visual fatigue estimation unit 103 transfers the calculated overall visual fatigue estimating value (Fa) to the fatigue recovery control unit 104, in order for the fatigue recovery control unit 104 to control the subsequent playback of the three-dimensional video stream display unit 105 according to the overall visual fatigue estimating value (Fa), thereby effectively reducing the visual fatigue of the viewer. For example, when the overall visual fatigue estimating value (Fa) is excessively large, the fatigue recovery control unit 104 is capable of reducing the visual fatigue of the viewer by means such as decreasing the disparity range, decreasing the disparity velocity, decreasing the disparity acceleration, lowering the display contrast, lowering the display brightness, varying the playback velocity, directly switching to the two-dimensional display or generating an alter to notice the viewer. Contrarily, when the overall visual fatigue estimating value (Fa) has been sustained small, the fatigue recovery control unit 104 is capable of enhancing the three-dimensional perception effect of the images by means such as increasing the disparity range, increasing the disparity velocity, increasing the disparity acceleration.

The three-dimensional video stream display unit 105 displays the images after being processed by the fatigue recovery control unit 104 to the viewer.

The method for calculating the visual fatigue estimating value (Fa) accompanied with Example 1 through Example 10 is illustrated in the following to further describe the disclosure in details.

Example 1

The disparity estimation unit 102 (as shown in FIG. 3) is employed to directly retrieve the disparity velocity (DS) of the video stream within a certain time in the three-dimensional video, so as to calculate the visual fatigue estimating values (fa、Fa). Here, the disparity velocity (DS) can be the mean disparity velocity or the maximum disparity velocity within the certain time, for instance. In Example 1, the formula of calculating the visual fatigue estimating value Fa is: Fa=fa=DS.

Example 2

The disparity estimation unit 102 (as shown in FIG. 3) is employed to calculate the disparity velocity (DS) of the video stream for each of the time units within a certain time interval in the three-dimensional video, and to calculate the accumulation of visual fatigue within the certain time interval, so as to serve as the visual fatigue estimating value Fa. In Example 2, the formula of calculating the visual fatigue estimating value Fa is: $Fa=\Sigma_{T_1}^{T_2}fa=\Sigma_{T_1}^{T_2}DS_T$ (Formula 6.1), in which $T_1$ equals to a start time and $T_2$ equals to an end time.

Example 3

The disparity estimation unit 102 (as shown in FIG. 3) is employed to calculate the disparity velocity (DS) of the video stream for each of the time units within a certain time interval in the three-dimensional video. Since the accumulation of visual fatigue is accelerated as the viewing time increases, different temporal weights ($R_T$) may be given in accordance with the time point for each of the video streams. In other words, a certain video stream firstly being played is given with a lower temporal weight ($R_T$), and a certain video stream subsequently being played is given with a higher temporal weight ($R_T$), while calculating the visual fatigue estimating value (Fa). Afterwards, the visual fatigue estimating value (Fa) within such time interval is calculated. In Example 3, the formula of calculating the visual fatigue estimating value (Fa) is: $Fa=\Sigma_{T_1}^{T_2}fa=\Sigma_{T_1}^{T_2}DS_T R_T$ (Formula 6.2), in which $R_T$ is the temporal weight (where $R_T \geq 1$), $T_1$ equals to a start time and $T_2$ equals to an end time.

Example 4

The disparity estimation unit 102 (as shown in FIG. 3) is employed to calculate the disparity velocity (DS) of the video stream for each of the time units within a certain time interval in the three-dimensional video. When the disparity velocity (DS) of the video stream for each of the time units within the certain time interval is not identical to each other, and the relationship between the visual fatigue estimating value (Fa) and the disparity velocity (DS) is not equally proportional (for example, when the disparity velocity (DS) reaches above a specific value, and the visual fatigue estimating value (Fa) increases substantially), the method for the visual fatigue estimating value (fa) may give different disparity velocity weights ($V_i$) according to the magnitude of the disparity velocity (DS). In Example 4, the formula of calculating the visual fatigue estimating value (fa) is: $fa=DS_i V_i$, and the formula of calculating the visual fatigue estimating value (Fa)

is: $Fa=\Sigma_{T_1}^{T_2}fa=\Sigma_{T_1}^{T_2}DS_iV_i$ (Formula 6.3), in which $V_i$ is the disparity velocity weight (where $V_i \geq 1$), $T_1$ equals to a start time and $T_2$ equals to an end time.

Figure 4:
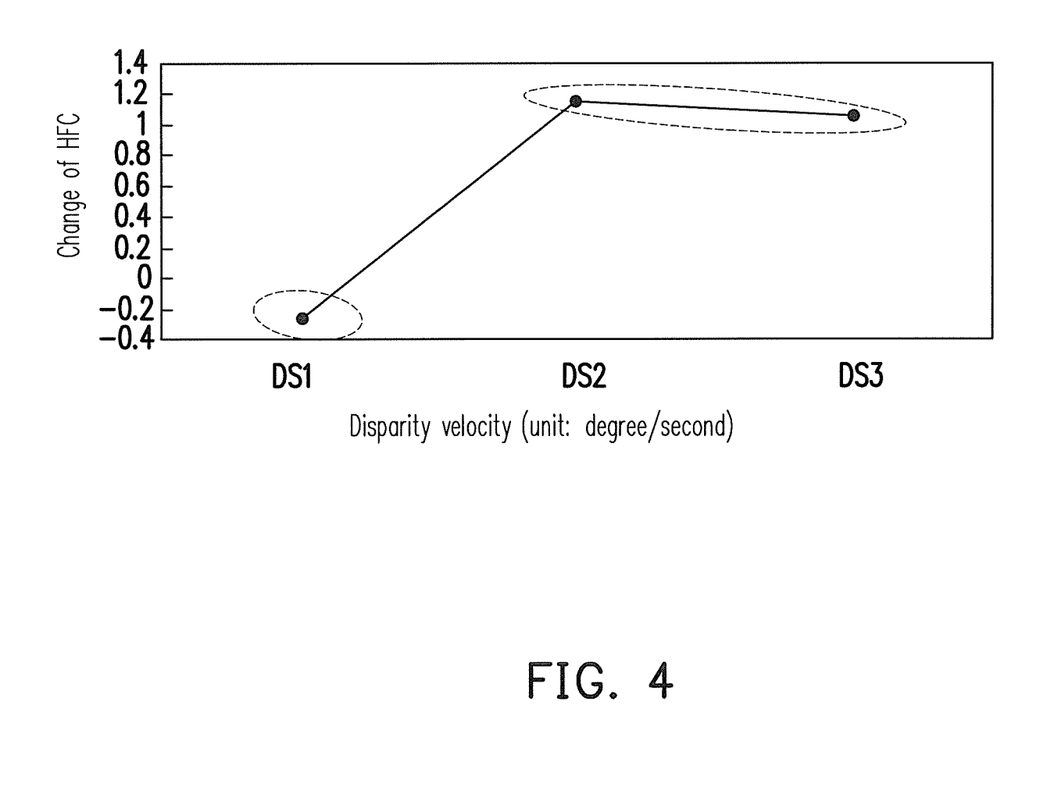
FIG. 4 is a diagram illustrating the relationship between a disparity velocity and a change of High Frequency Component (HFC) of a subject.

FIG. 4 is a diagram illustrating the relationship between a disparity velocity and a change of High Frequency Component (HFC) of a subject. Referring to FIG. 4, through the data from the performed ergonomic test, the relationship between the change of HFC of the subject being detected by ANOVA and the disparity velocity (such as DS1, DS2 and D3) is non-linear in the embodiment. Here, HFC is defined between 1.0 Hz to 2.1 Hz or 1.0 Hz to 2.3 Hz, where HFC is related to the mechanical elasticity of crystalline lens, ciliary muscle or circular muscle of a human eye. In other words, the relationship between the disparity velocity (DS) and the fatigue of ciliary muscle in the human eye is non-proportional. To be specific, the subject in Example 4 watches a 24 inches auto-stereoscopic 3D displayer with a 2-view lenticular plate and dual view, and the disparity velocity (DS) of the dynamic body object displayed by the 3D displayer may be DS1, DS2 and DS3. According to the detection result, it can be seen that the disparity velocity (DS) of the dynamic body object has a significant impact on the fatigue of ciliary muscle in the human eye, in terms of the statistical consideration.

As shown in FIG. 4, when the disparity velocity (DS) is DS1, the fatigue of ciliary muscle of the viewer is relatively low, whereas when the disparity velocity (DS) is increased to DS2 or DS3, the fatigue of ciliary muscle of the viewer is relatively high.

It is assumed that the disparity velocity (DS) of the video stream for each of the time units within a certain time interval in the three-dimensional video is distributed between DS1 to DS3. When the disparity velocity (DS) of the video stream falls within the range of DS1 to DS2, a low numerical value should be selected for the disparity velocity weight ($V_i$), so as to calculate the visual fatigue estimating value (fa) of such video stream. When the disparity velocity (DS) of the video stream falls within the range of DS2 to DS3, a high numerical value should be selected for the disparity velocity weight ($V_i$), so as to calculate the visual fatigue estimating value (fa) of another video stream. For example, the visual fatigue estimating value (fa) can be a quadratic or higher-order function of the disparity velocity (DS) (i.e., the non-linear relationship).

According to the above described, the overall visual fatigue estimating value (Fa) can then be obtained by Formula: $Fa=\Sigma_{T_1}^{T_2}fa=\Sigma_{T_1}^{T_2}DS_iV_i$.

Example 5

The disparity estimation unit 102 (as shown in FIG. 3) is employed to calculate the disparity velocity (DS) of the video stream for each of the time units within a certain time interval, and the temporal weight ($R_T$) may be further considered, other than the disparity velocity weight ($V_i$). In Example 5, the formulas of calculating the visual fatigue estimating value (fa) and the overall visual fatigue estimating value (Fa) are: $fa=DS_{Ti}R_TV_i$, $Fa=\Sigma_{T_1}^{T_2}fa=\Sigma_{T_1}^{T_2}DS_{Ti}R_TV_i$ (Formula 6.4), in which the temporal weight $R_T \geq 1$, the disparity velocity weight $V_i \geq 1$, $T_1$ equals to a start time and $T_2$ equals to an end time. Additionally, in Example 5, the visual fatigue estimating value (fa) can be a quadratic or higher-order function of the disparity velocity (DS) (where the visual fatigue estimating value (fa) and the disparity velocity weight $V_i$ are in a non-linear relationship), and the visual fatigue estimating value (fa) can be a quadratic or higher-order function of the time (T) (where the visual fatigue estimating value (fa) and the temporal weight $R_T$ are in a non-linear relationship).

Example 6

The disparity estimation unit 102 (as shown in FIG. 3) is employed to calculate the disparity velocity (DS) of the video stream for each of the time units within a certain time interval. Within the time interval, the dynamic body object in each of the time units has different disparity velocities (DS) and different disparity ranges (D). When the disparity velocity (DS) and the disparity range (D) have different impacts on the visual fatigue estimating value (fa) respectively without the interaction effect between the disparity velocity (DS) and the disparity range (D), the method for calculating the visual fatigue estimating value (fa) is to give each of the video streams with different disparity range weights ($W_d$) and different disparity velocity weights ($V_i$), while the method for calculating the visual fatigue estimating value (Fa) is to aggregate the visual fatigue estimating values (fa). In Example 6, the formula of calculating the visual fatigue estimating value (fa) is: $fa=DS_{di}W_dV_i$, and the formula of calculating the visual fatigue estimating value (Fa) is: $Fa=\Sigma_{T_1}^{T_2}fa=\Sigma_{T_1}^{T_2}DS_{di}W_dV_i$ (Formula 6.5), in which the disparity range weight $W_d \geq 1$, and the disparity velocity weight $V_i \geq 1$.

Figure 5:
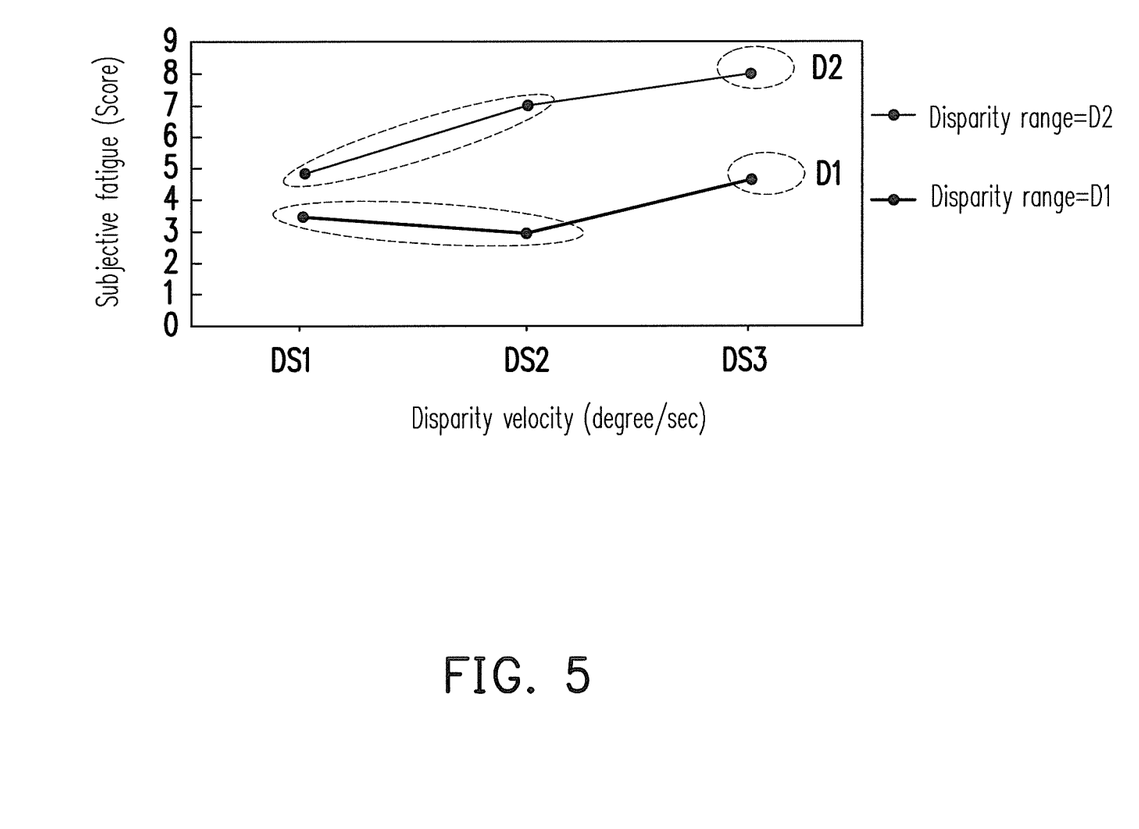
FIG. 5 and FIG. 6 are diagrams illustrating the relationship between a disparity velocity and a subjective fatigue (score) of a subject, and the relationship between a disparity range and a subjective fatigue (score) of a subject, respectively.

FIG. 5 is a diagram illustrating the relationship among a disparity velocity, a disparity range and a subjective fatigue (score) of a subject. Referring to FIG. 5, through the data from the performed ergonomic test, the relationship among the subjective fatigue (score) of the subject being detected by ANOVA, the disparity range (D) and the disparity velocity (such as DS1, DS2 and D3) is non-linear in the embodiment. To be specific, the subject in Example 6 watches a 24 inches auto-stereoscopic 3D displayer with a 2-view lenticular plate and dual view, the disparity velocity (DS) of the dynamic body object displayed by the 3D displayer may be DS1, DS2 and DS3, and the disparity range (D) of the dynamic body object displayed by the 3D displayer may be D1 and D2. According to the detection result, in terms of the statistical consideration, it can be seen that the disparity range (D) of the dynamic body object has a significant impact on the fatigue of ciliary muscle in the human eye, and the disparity velocity (DS) of the dynamic body object also has a significant impact on the fatigue of ciliary muscle in the human eye.

As shown in FIG. 5, when the disparity range (D) is D1, the subjective fatigue of the viewer is relatively low, whereas when the disparity range (D) is increased to D2, the subjective fatigue of the viewer is relatively high. Additionally, when the disparity velocity (DS) is DS1, the subjective fatigue of the viewer is relatively low, whereas when the disparity velocity (DS) is increased to DS2 or DS3, the subjective fatigue of the viewer is relatively high.

It is assumed that the disparity velocity (DS) for each of the video streams within a certain time interval in the three-dimensional video is distributed between DS1 to DS3, and the disparity range (D) is between D1 and D2. When the disparity range (D) of the video stream falls nearby D1, a low numerical value should be selected for the disparity range weight ($W_d$). When the disparity range (D) of the video stream falls nearby D2, a high numerical value should be selected for the disparity range weight ($W_d$). Additionally, when the disparity velocity (DS) of the video stream falls within the range of DS1 to DS2, a low numerical value should be selected for the disparity velocity weight ($V_i$). When the disparity velocity (DS) of the video stream falls within the range of DS2 to DS3, a high numerical value should be selected for the disparity velocity weight ($V_i$). For example, the visual fatigue estimating value (fa) can be a quadratic or higher-order function of the disparity velocity (DS) (i.e., the non-linear relationship), and the visual fatigue estimating value (fa) can be a quadratic or higher-order function of the disparity range (D) (i.e., the non-linear relationship).

According to the above described, the overall visual fatigue estimating value (Fa) can then be obtained by Formula: $Fa=\Sigma_{T_1}^{T_2} fa = \Sigma_{T_1}^{T_2} DS_{di} W_d V_i$.

Example 7

The disparity estimation unit 102 (as shown in FIG. 3) is employed to calculate the disparity velocity (DS) of the video stream for each of the time units within a certain time interval. Within the time interval, the dynamic body object in each of the time units has different disparity velocities (DS) and different motion disparity ranges (D), where there is a strong interaction effect between the disparity velocity (DS) and the disparity range (D). This indicates that the variation of the disparity velocity (DS) such as increasing or decreasing has no impact on the visual fatigue when the disparity range (D) is small, however, the magnitude of the disparity velocity (DS) becomes the key factor that influences the visual fatigue when the disparity range (D) is large. In this case, when the disparity range (D) is small, the formula of calculating the visual fatigue estimating value (fa) is: $Fa=\Sigma_{T_1}^{T_2} fa = \Sigma_{T_1}^{T_2} DS_{di}$ (Formula 6.7), whereas when the disparity range (D) is large (which can be assumed greater than a predetermined value d), the formula of calculating the visual fatigue estimating value (fa) is: $Fa=\Sigma_{T_1}^{T_2} fa = \Sigma_{T_1}^{T_2} DS_{di} W_d V_i$ (Formula 6.6), in which the disparity range weight $W_d \geq 1$, and the disparity velocity weight $V_i \geq 1$.

According to the above described, the overall visual fatigue estimating value (Fa) can then be obtained by Formula: $Fa=\Sigma_{T_1}^{T_2} fa$.

Figure 6:
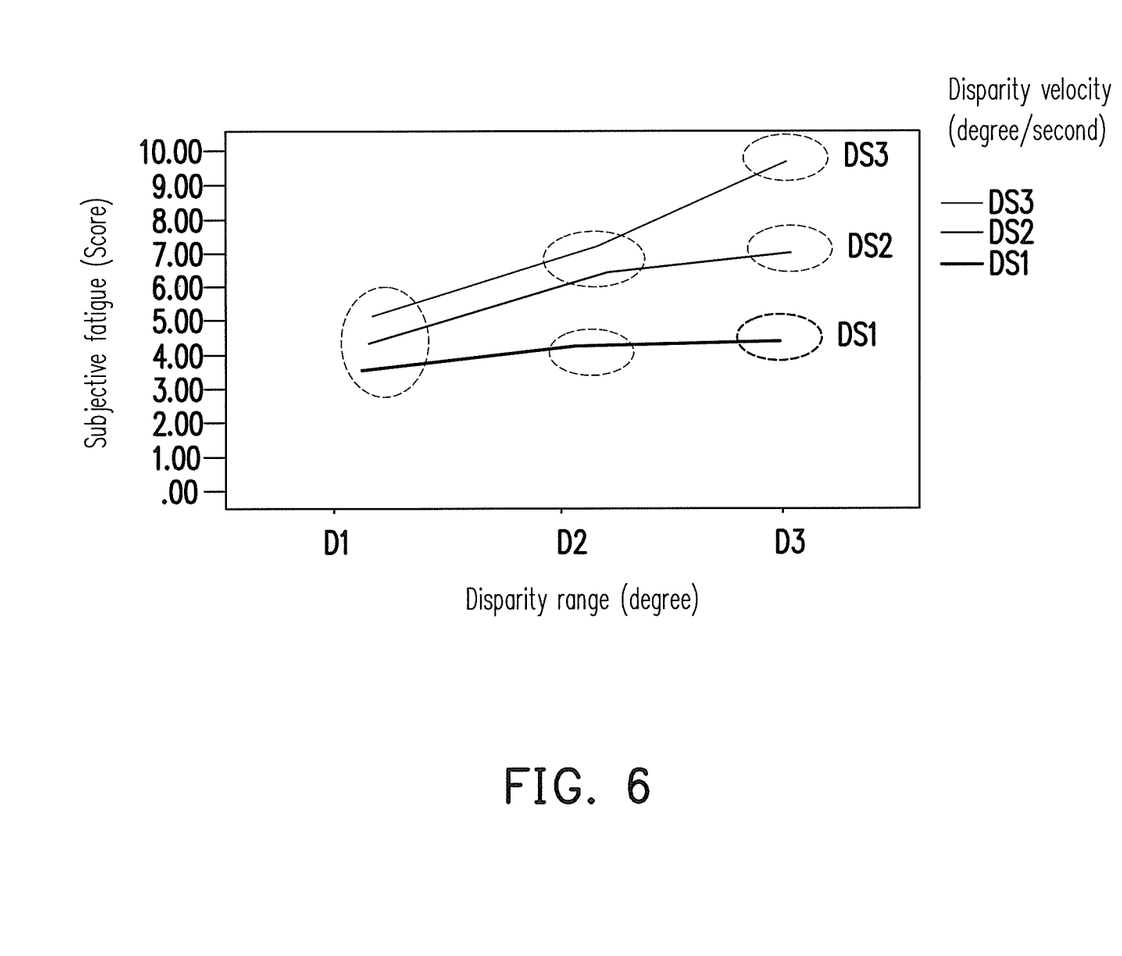

FIG. 6 is a diagram illustrating the relationship among a disparity velocity, a disparity range and a subjective fatigue (score) of a subject. Referring to FIG. 6, through the data from the performed ergonomic test, the relationship among the subjective fatigue (score) of the subject being detected by ANOVA, the disparity range (such as D1, D2 and D3) and the disparity velocity (such as DS1, DS2 and D3) is non-linear in the embodiment. To be specific, the subject in Example 7 watches a 50 inches non auto-stereoscopic 3D shutter displayer, the disparity velocity (DS) of the dynamic body object displayed by the 3D displayer may be DS1, DS2 and DS3, and the disparity range (D) of the dynamic body object displayed by the 3D displayer may be D1, D2 and D3. According to the detection result, in terms of the statistical consideration, it can be seen that there is a strong and significant interaction between the disparity velocity (DS) and the disparity range (D) of the dynamic body object.

As shown in FIG. 6, when the motion disparity range of the dynamic body object falls within D1, there is no very notable difference among the subjective fatigues corresponding to the different disparity velocities DS1, DS2 and DS3. When the motion disparity of the dynamic body object reaches to D2, the subjective fatigue corresponding to the disparity velocity DS1 is significantly lower, whereas the subjective fatigues corresponding to the disparity velocities DS2 and DS3 are significantly higher. When the motion disparity of the dynamic body object reaches to D3, the subjective fatigue corresponding to the disparity velocity DS1 is significantly lower, whereas the subjective fatigue corresponding to the disparity velocity DS2 is between the subjective fatigues corresponding to the disparity velocities DS1 and DS3.

When the disparity range (D) of the video stream falls nearby D1, since the disparity range is relatively small, the disparity velocities (i.e., DS1, DS2 and DS3) have no significantly impact on the subjective fatigues. At the moment, the visual fatigue estimating value (fa) may apply to the calculation method. When the disparity range (D) of the video stream falls nearby D2 or D3, since the disparity range is relatively large, the disparity velocities (i.e., DS1, DS2 and DS3) have significantly impact on the subjective fatigues. At the moment, the visual fatigue estimating value (fa) may apply to the another calculation method.

Example 8

The disparity estimation unit 102 (as shown in FIG. 3) is employed to calculate the disparity velocity (DS) and the disparity range (D) of the video stream for each of the time units within a certain time interval, and the temporal weight ($R_T$) of the video stream within each of the time units may be further considered in Example 8, other than the disparity velocity (DS) and the disparity range (D). In other words, Example 3 and Example 6 can be integrated to calculate the visual fatigue estimating value (fa). In Example 8, the formula of calculating the visual fatigue estimating value (fa) is: $fa=DS_{Tdi} R_T W_d V_i$, and the formula of calculating the visual fatigue estimating value (Fa) is: $Fa=\Sigma_{T_1}^{T_2} fa = \Sigma_{T_1}^{T_2} DS_{Tdi} R_T W_d V_i$ (Formula 6.8), in which the temporal weight $R_T \geq 1$, the disparity range weight $W_d \geq 1$, the disparity velocity weight $V_i \geq 1$, $T_1$ equals to a start time and $T_2$ equals to an end time.

In Example 8, the visual fatigue estimating value (fa) can be a quadratic or higher-order function of the disparity velocity (DS) (i.e., the non-linear relationship), the visual fatigue estimating value (fa) can be a quadratic or higher-order function of the disparity range (D) (i.e., the non-linear relationship), and the visual fatigue estimating value (fa) can be a quadratic or higher-order function of the time (T) (i.e., the non-linear relationship).

Example 9

The disparity estimation unit 102 (as shown in FIG. 3) is employed to calculate the disparity velocity (DS) of the video stream for each of the time units within a certain time interval, and the direction of the dynamic body object may be considered, which can be the direction towards a negative disparity velocity (namely, the direction gradually approaching to the viewer) or the direction towards a positive disparity direction (namely, the direction gradually away from the viewer), where different weights $Q_j$ are given to the different motion directions. Generally speaking, when the dynamic body object moves towards the direction approaching to the viewer, the visual fatigue estimating value (fa) caused by the viewer is relatively high, so that a high numerical value should be selected for the weight $Q_j$. When the dynamic body object moves towards the direction away from the viewer, the visual fatigue estimating value (fa) caused by the viewer is relatively low, so that a low numerical value should be selected for the weight $Q_j$.

In Example 9, the formula of calculating the visual fatigue estimating value (fa) is: $fa=DS_i Q_j$, and the formula of calculating the visual fatigue estimating value (Fa) is: $Fa=\Sigma_{T_1}^{T_2} fa = \Sigma_{T_1}^{T_2} DS_i Q_j$ (Formula 6.9), in which $Q_j$ is the disparity velocity weight (where $Q_j \geq 1$), $T_1$ equals to a start time and $T_2$ equals to an end time.

Example 10

The disparity estimation unit 102 (as shown in FIG. 3) is employed to calculate the disparity acceleration (DA) of the video stream for each of the time units within a certain time interval, and the disparity acceleration (DA) may be the mean disparity acceleration or the maximum disparity acceleration within the time interval, for instance. In Example 10, the formula of calculating the visual fatigue estimating value (fa) is: Fa=fa=DA. Additionally, the method for calculating the disparity acceleration (DA) in Example 10 is similar to the method for calculating the disparity velocity (DS) in Example 1 to Example 9, and thus the detailed description for the calculation method of the disparity acceleration (DA) will be omitted herein.

In summary, since the disclosure calculates the visual fatigue estimating value according to the disparity velocity or the disparity acceleration, the method and the control system in the disclosure are capable of reducing the visual fatigue of the viewer effectively.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for playing a three-dimensional video, comprising:
    calculating a disparity velocity or a disparity acceleration for at least one continuous video in the three-dimensional video;
    calculating a visual fatigue estimating value of a viewer according to the disparity velocity or the disparity acceleration, wherein the step of calculating the visual fatigue estimating value comprises:
        calculating a visual fatigue estimating value (fa) according to Formula (3), wherein Formula (3) is fa=f(DA), where fa is a visual fatigue estimating value of the viewer after watching at each of time units in the at least one continuous video, and DA is a disparity acceleration for each of the time units in the at least one continuous video; and
        calculating an overall visual fatigue estimating value (Fa) according to Formula (4), wherein Formula (4) is Fa=f(fa, T), where T is a playback time for the at least one continuous video, wherein the overall visual fatigue estimating value is calculated according to Formula (6.8), where Formula (6.8) is Fa=$\Sigma_{T_1}^{T_2}$fa=$\Sigma_{T_1}^{T_2}$DS$_{Tdi}$R$_T$W$_d$V$_i$, DS$_{Tdi}$ is the disparity velocity, W$_d$ is a disparity range weight, R$_T$ is a temporal weight, V$_i$ is a disparity velocity weight, T1 is a start time for the at least one continuous video, and T2 is an end time for the at least one continuous video; and
    controlling a subsequent playback of the three-dimensional video according to the visual fatigue estimating value.

2. The method for playing the three-dimensional video according to claim 1, wherein the disparity velocity comprises a mean disparity velocity, a maximum disparity velocity and/or a minimum disparity velocity.

3. The method for playing the three-dimensional video according to claim 1, wherein the disparity acceleration comprises a mean disparity acceleration, a maximum disparity acceleration and/or a minimum disparity acceleration.

4. The method for playing the three-dimensional video according to claim 1, wherein the overall visual fatigue estimating value is calculated according to Formula (6.1), where Formula (6.1) is Fa=$\Sigma_{T_1}^{T_2}$fa=$\Sigma_{T_1}^{T_2}$DS$_T$, DS$_T$ is the disparity velocity, T1 is a start time for the at least one continuous video, and T2 is an end time for the at least one continuous video.

5. The method for playing the three-dimensional video according to claim 1, wherein the overall visual fatigue estimating value is calculated according to Formula (6.2), where Formula (6.2) is Fa=$\Sigma_{T_1}^{T_2}$fa=$\Sigma_{T_1}^{T_2}$DS$_T$R$_T$, DS$_T$ is the disparity velocity, R$_T$ is a temporal weight, T1 is a start time for the at least one continuous video, and T2 is an end time for the at least one continuous video.

6. The method for playing the three-dimensional video according to claim 1, wherein the overall visual fatigue estimating value is calculated according to Formula (6.3), where Formula (6.3) is Fa=$\Sigma_{T_1}^{T_2}$fa=$\Sigma_{T_1}^{T_2}$DS$_i$V$_i$, DS$_i$ is the disparity velocity, V$_i$ is a disparity velocity weight, T1 is a start time for the at least one continuous video, and T2 is an end time for the at least one continuous video.

7. The method for playing the three-dimensional video according to claim 1, wherein the overall visual fatigue estimating value is calculated according to Formula (6.4), where Formula (6.4) is Fa=$\Sigma_{T_1}^{T_2}$fa=$\Sigma_{T_1}^{T_2}$DS$_{Ti}$R$_T$V$_i$, DS$_T$ is the disparity velocity, R$_T$ is a temporal weight, V$_i$ is a disparity velocity weight, T1 is a start time for the at least one continuous video, and T2 is an end time for the at least one continuous video.

8. The method for playing the three-dimensional video according to claim 1, wherein the overall visual fatigue estimating value is calculated according to Formula (6.5), where Formula (6.5) is Fa=$\Sigma_{T_1}^{T_2}$fa=$\Sigma_{T_1}^{T_2}$DS$_{di}$W$_d$V$_i$, DS$_{di}$ is the disparity velocity, W$_d$ is a disparity range weight, V$_i$ is a disparity velocity weight, T1 is a start time for the at least one continuous video, and T2 is an end time for the at least one continuous video.

9. The method for playing the three-dimensional video according to claim 1, wherein the step of calculating the overall visual fatigue estimating value comprises:
    when a disparity range is greater than a predetermined value, the overall visual fatigue estimating value is calculated according to Formula (6.6), where Formula (6.6) is Fa=$\Sigma_{T_1}^{T_2}$fa=$\Sigma_{T_1}^{T_2}$DS$_{di}$W$_d$V$_i$, DS$_{di}$ is the disparity velocity, W$_d$ is a disparity range weight, V$_i$ is a disparity velocity weight, T1 is a start time for the at least one continuous video, and T2 is an end time for the at least one continuous video; and
    when the disparity range is less than the predetermined value, the overall visual fatigue estimating value is calculated according to Formula (6.7), where Formula (6.7) is Fa=$\Sigma_{T_1}^{T_2}$fa=$\Sigma_{T_1}^{T_2}$DS$_{di}$.

10. The method for playing the three-dimensional video according to claim 1, wherein the disparity velocity or the disparity acceleration for the at least one continuous video is obtained by calculating all of regions in the at least one continuous video.

11. The method for playing the three-dimensional video according to claim 1, wherein the disparity velocity or the disparity acceleration for the at least one continuous video is obtained by calculating a part of regions in the at least one continuous video.

12. A control system adapted to control a playback of a three-dimensional video, the control system comprising:
    a three-dimensional video stream input unit;
    a disparity estimation unit, coupled to the three-dimensional video stream input unit, wherein the disparity estimation unit calculates a disparity velocity or a disparity acceleration for at least one continuous video in the three-dimensional video;

a visual fatigue estimation unit, coupled to the disparity estimation unit, wherein the visual fatigue estimation unit calculates a visual fatigue estimating value (fa) according to Formula (3) and an overall visual fatigue estimating value (Fa) according to Formula (4),
    wherein Formula (3) is fa=f(DA), where fa is a visual fatigue estimating value of the viewer after watching at each of time units in the at least one continuous video, and DA is a disparity acceleration for each of the time units in the at least one continuous video, and
    wherein Formula (4) is Fa=f(fa, T), where T is a playback time for the at least one continuous video, wherein the overall visual fatigue estimating value is calculated according to Formula (6.8), where Formula (6.8) is $Fa=\Sigma_{T_1}^{T_2} fa=\Sigma_{T_1}^{T_2} DS_{Tdi} R_T W_d V_i$, $DS_{Tdi}$ is the disparity velocity, $W_d$ is a disparity range weight, $R_T$ is a temporal weight, $V_i$ is a disparity velocity weight, T1 is a start time for the at least one continuous video, and T2 is an end time for the at least one continuous video;
a fatigue recovery control unit, coupled to the three-dimensional video stream input unit and the visual fatigue estimation unit, wherein the fatigue recovery control unit controls a subsequent playback of the three-dimensional video according to the visual fatigue estimating value; and
a three-dimensional video stream display unit, coupled to the fatigue recovery control unit.

13. A control system adapted to control a playback of a three-dimensional video, the control system comprising:
    a three-dimensional video stream input unit;
    a disparity estimation unit, coupled to the three-dimensional video stream input unit, wherein the disparity estimation unit calculates a disparity velocity or a disparity acceleration for at least one continuous video in the three-dimensional video;
    a visual fatigue estimation unit, coupled to the disparity estimation unit, wherein the visual fatigue estimation unit calculates a visual fatigue estimating value (fa) according to Formula (3) and an overall visual fatigue estimating value (Fa) according to Formula (4),
        wherein Formula (3) is fa=f(DA), where fa is a visual fatigue estimating value of the viewer after watching at each of time units in the at least one continuous video, and DA is a disparity acceleration for each of the time units in the at least one continuous video, and
        wherein Formula (4) is Fa=f(fa, T), where T is a playback time for the at least one continuous video, wherein the overall visual fatigue estimating value is calculated according to Formula (6.9), where Formula (6.9) is $Fa=\Sigma_{T_1}^{T_2} fa=\Sigma_{T_1}^{T_2} DS_i Q_j$, $DS_i$ is the disparity velocity, $Q_j$ is a disparity direction weight, T1 is a start time for the at least one continuous video, and T2 is an end time for the at least one continuous video;
    a fatigue recovery control unit, coupled to the three-dimensional video stream input unit and the visual fatigue estimation unit, wherein the fatigue recovery control unit controls a subsequent playback of the three-dimensional video according to the visual fatigue estimating value; and
    a three-dimensional video stream display unit, coupled to the fatigue recovery control unit.

14. A control system adapted to control a playback of a three-dimensional video, the control system comprising:
    a three-dimensional video stream input unit;
    a disparity estimation unit, coupled to the three-dimensional video stream input unit, wherein the disparity estimation unit calculates a disparity velocity or a disparity acceleration for at least one continuous video in the three-dimensional video;
    a visual fatigue estimation unit, coupled to the disparity estimation unit, wherein the visual fatigue estimation unit calculates a visual fatigue estimating value (fa) according to Formula (7) and an overall visual fatigue estimating value (Fa) according to Formula (8),
        wherein Formula (7) is fa=f(DA, X), where fa is a visual fatigue estimating value of the viewer after watching at each of time units in the at least one continuous video, DA is a disparity acceleration for each of the time units in the at least one continuous video, and X comprises at least one of a time, a disparity velocity, a temporal weight, a disparity velocity weight, a disparity range weight, a disparity mean position and a disparity direction, and
        wherein Formula (8) is Fa=f(fa, T), where T is a playback time for the at least one continuous video;
    a fatigue recovery control unit, coupled to the three-dimensional video stream input unit and the visual fatigue estimation unit, wherein the fatigue recovery control unit controls a subsequent playback of the three-dimensional video according to the visual fatigue estimating value; and
    a three-dimensional video stream display unit, coupled to the fatigue recovery control unit.

15. A method for playing a three-dimensional video, comprising:
    calculating a disparity velocity or a disparity acceleration for at least one continuous video in the three-dimensional video;
    calculating a visual fatigue estimating value of a viewer according to the disparity velocity or the disparity acceleration, wherein the step of calculating the visual fatigue estimating value comprises:
        calculating a visual fatigue estimating value (fa) according to Formula (3), wherein Formula (3) is fa=f(DA), where fa is a visual fatigue estimating value of the viewer after watching at each of time units in the at least one continuous video, and DA is a disparity acceleration for each of the time units in the at least one continuous video; and
        calculating an overall visual fatigue estimating value (Fa) according to Formula (4), wherein Formula (4) is Fa=f(fa, T), where T is a playback time for the at least one continuous video, wherein the overall visual fatigue estimating value is calculated according to Formula (6.9), where Formula (6.9) is $Fa=\Sigma_{T_1}^{T_2} fa=\Sigma_{T_1}^{T_2} DS_i Q_j$, $DS_i$ is the disparity velocity, $Q_j$ is a disparity direction weight, T1 is a start time for the at least one continuous video, and T2 is an end time for the at least one continuous video; and
    controlling a subsequent playback of the three-dimensional video according to the visual fatigue estimating value.

16. A method for playing a three-dimensional video, comprising:
    calculating a disparity velocity or a disparity acceleration for at least one continuous video in the three-dimensional video;
    calculating a visual fatigue estimating value of a viewer according to the disparity velocity or the disparity acceleration, wherein the step of calculating the visual fatigue estimating value comprises:
        calculating a visual fatigue estimating value (fa) according to Formula (7), wherein Formula (7) is fa=f(DA, X), where fa is a visual fatigue estimating value of the viewer after watching at each of time units in the at least one continuous video, DA is a disparity acceleration for each of the time units in the at least one continuous video, and X comprises at least one of a time, a disparity velocity, a temporal weight, a disparity velocity weight, a disparity range weight, a disparity mean position and a disparity direction; and calculating an overall visual fatigue estimating value (Fa) according to Formula (8), wherein Formula (8) is Fa=f(fa, T), where T is a playback time for the at least one continuous video; and controlling a subsequent playback of the three-dimensional video according to the visual fatigue estimating value.

* * * * *